INVENTORS.
ROBERT J. BLACK
FRANK J. SORDELLO

BY Vernon H. McCleary [signature]
ATTORNEY

United States Patent Office 3,427,606

Patented Feb. 11, 1969

3,427,606
MEMORY SYSTEM

Robert J. Black, Los Gatos, and Frank J. Sordello, San Jose, Calif., assignors to International Business Machines Corporation, Armonk, N.Y., a corporation of New York Filed Mar. 2, 1966, Ser. No. 531,135
U.S. Cl. 340—174.1 7 Claims
Int. Cl. G11b *21/10*

ABSTRACT OF THE DISCLOSURE

A servosystem for the head of a magnetic disk to position the head over a desired data track. The data tracks are alternately interleaved with servo tracks. The servo tracks are all the same frequency but adjacent servo tracks are in phase opposition. Each servo track, in addition, utilizes for a coarse adjustment, phase reversals that define predetermined distances that identify, for coarse adjustment, the desired data track. Thus, the initial servoing of the head with respect to the data track is done when the desired coarse time length is read through the head. The fine adjustment is accomplished by the servo head reading the two sine waves in phase opposition. Thus, when complete cancellation occurs between the two servos, the head is over the data track. The fine adjustment continues to maintain the servo over the head and consequently, the read head over the desired data track.

This invention relates to memory systems and more specifically to means for automatically servoing the pickup transducer of a memory system over a desired processor-data information memory track, while utilizing a single pickup transducer for both the servo position information and the processor-data information.

In positioning a pickup head relative to a processor-data information memory track, it is normally desirable and/or necessary to provide both coarse and fine adjustment of the head relative to the track, and/or tracks. More specifically, the coarse adjustment will normally position the pickup head near a desired processor-data information track (between the desired track and another processor-data information track) and the fine positioning servo will position the pickup head directly over the desired track. In patent application, Ser. No. 245,572, filed Dec. 18, 1962, entitled, "Magnetic Track Following Servosystem" (now abandoned, with copending application Ser. No. 631,103, filed Apr. 14, 1967, entitled, "Magnetic Track Following Servosystem" being a continuation thereof) there is disclosed a system to provide fine positioning of a pickup with respect to a processor-data information track. Previously, the servoing signals for fine and coarse positioning adjustment of the pickup with respect to the processor-data information track, are separate and distinct as shown in the above entitled patent application. This, of course, requires separate circuitry, separate signals and may require separate transducers for both fine and coarse positioning. An additional problem is if the servo information and the processor-data information is to be contained on separate layers of the same dual magnetic layered disk, then the bandwidth of the servo information must be restricted such that its frequency components do not interfere with the processor-data signals.

Thus, an object of the invention is to provide a new and improved means for detecting the position of a first member with respect to a second member.

Still another object of the invention is the provision of a servo for providing both fine and coarse adjustment for positioning a pickup head with respect to a selected processor-data information track.

A still further object of the invention is to provide a servo for fine and coarse positioning of a pickup with respect to a selected processor-data information track that requires a minimum of parts with a minimum of interference of the servo information signals when reading out the processor-data information simultaneously with the identical pickup.

The above objects are realized in the present invention by providing two servo means which are effective to generate a first and a second continuous periodically varying signals that are 180 degrees out of phase or in phase opposition. As such, when a single pickup head is positioned so that these two signals completely cancel the pickup head is positioned directly over the processor-data information track. An additional feature of the present invention is that the servo tracks employed to develop the above servo positioning signals, effect coarse adjustment since these servo tracks have periodically spaced, timing signals to indicate a predetermined reference position time period that distinguishes one processor-data information track from all other processor-data information tracks. As such, the two servo tracks provide both fine and coarse information which is generated or can be generated through a single pickup head contrary to previous servo positioning systems.

The above and other objects, features and advantages of the present invention will be apparent from the following description taken in conjunction with the accompanying drawings wherein.

*General description*

Figure 1:
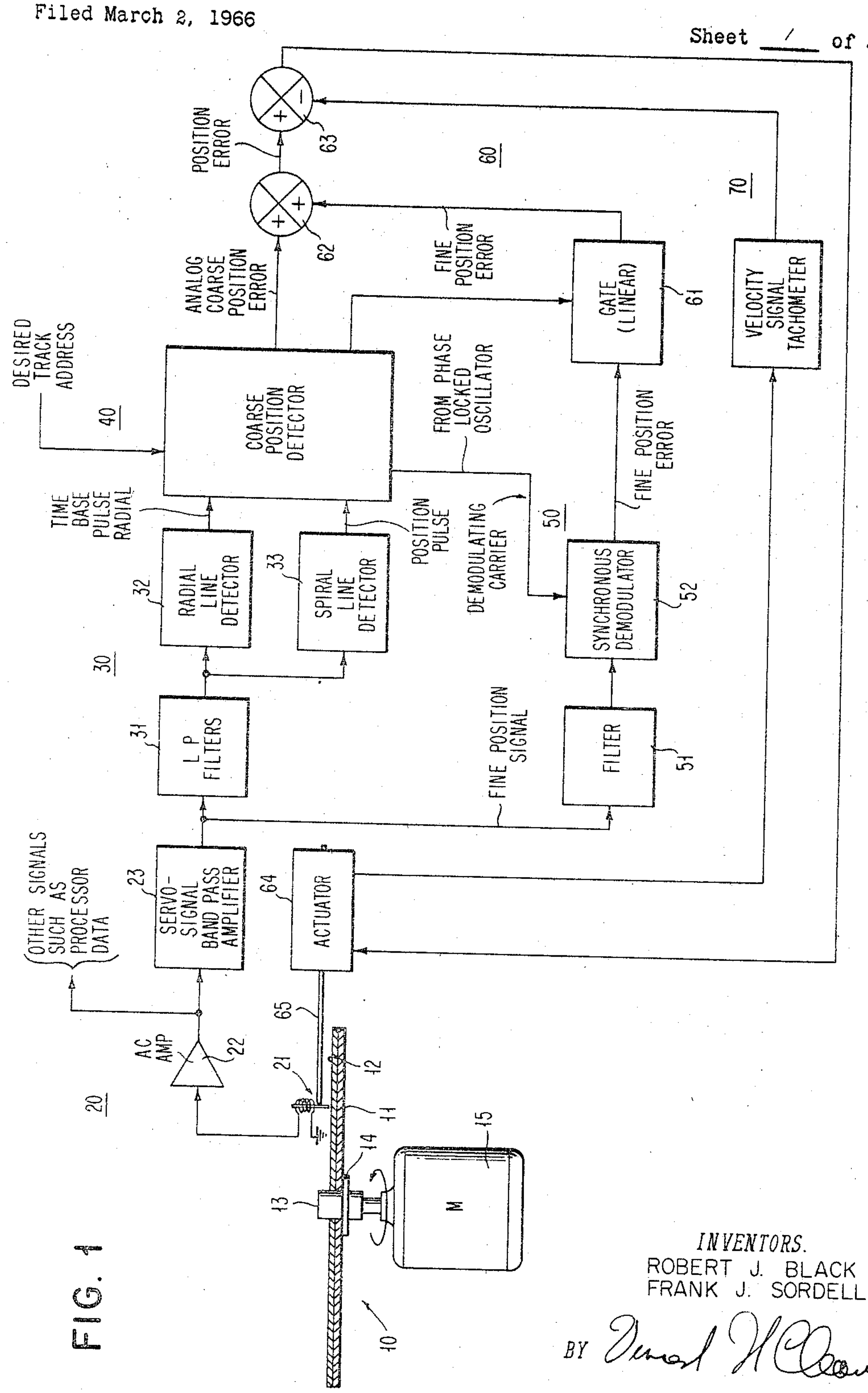
FIGURE 1 is a schematic diagram in block form of a preferred embodiment of the invention.
Figure 3:
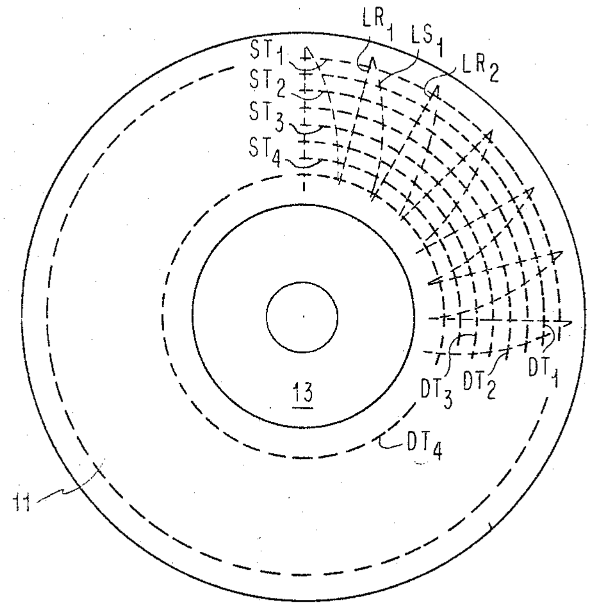
FIGURE 3 illustrates the plan view of the recording disk utilized in the embodiment of the invention illustrated in FIGURE 1.

Generally, the embodiment of the invention shown in FIGURE 1 in the drawing includes a magnetic disk memory member 10 having alternately recorded thereon servo position information tracks $ST_1$, $ST_2$, etc., and processor-data information tracks $DT_1$, $DT_2$, etc. shown in FIGURE 3. Each of the servo position information tracks has timing signals that define a position time period of different duration than any position timing period defined by similar timing pulses on the other servo position information tracks. This timing period is detected by a coarse position detector 40 to provide, through a closed loop servo a coarse position error signal to an actuator means 64 to give the pickup a coarse placement with respect to the desired data track. In addition to this coarse information, each servo track includes a portion that is a continuous sine wave (except for coarse position information phase shifts) portion that is 180 degrees out of phase with the two servo position information tracks adjacent thereto. After the coarse positioning of the pickup, with respect to the desired processor-data information track, the two adjacent sine wave portions of the adjacent servo position information tracks are compared within the single pickup so as to generate a signal continuously that will provide continuous servoing of the pickup with respect to the desired data track. Since the adjacent servo tracks are recorded 180 degrees out of phase, a single pickup can be utilized to provide a single output therefrom that without further detection represents the servo position error signal of the pickup with respect to the desired processor-data information track. In addition, since the same frequency is utilized in all servo position information tracks, a relatively small bandwidth may be employed with a comparatively low harmonic content so as to provide a minimum of interference with the identical single pickup head when reading out information on the processor-data information track. Further, as can be understood, both the fine and the coarse positioning signals and the processor-data information signals are passed through the single pickup head so as to simplify the circuitry, and eliminate the difficult mechanical alignment of one pickup to another pickup.

This fine position error information is provided by the comparison of the sine wave portions of the adjacent servo tracks by a fine positioning detector 50 so as to provide fine positioning of the pickup through the closed loop servo. This fine position error information signal appears in the form of a suppressed-carrier double-sideband signal.

*Detailed description*

The embodiment of the invention illustrated in the drawing as shown in FIGURE 1 is a closed servo loop for positioning a pickup with respect to a dual coercivity-layered disk 10. The magnetic memory disk 10 includes a high coercivity lower layer 11 and a lower coercivity upper layer 12 with the lower layer 11 having servo position information tracks magnetically recorded therein and the upper section 12 having the processor-data information tracks magnetically recorded therein. A suitable material for disk 10 is shown in U.S. Patent No. 3,219,353 issued Nov. 23, 1965, entitled "Magnetic Recording Medium." The disk 10 is positioned on a shaft 13 and supported by a flange 14 on the shaft 13 that is driven by a drive motor 15 at a predetermined speed so as to enable reading out of the tracks on the disk 10. FIGURE 3 illustrates a plan view of the disk 10 showing the servo position information tracks and the processor-data information tracks with the servo position information tracks being recorded in the higher coercivity section 11 and the processor data information tracks in the upper layer 12. The processor-data information tracks are illustrated in FIGURE 3 as $DT_1$, $DT_2$, $DT_3$ and $DT_4$. These tracks are equally spaced in the disk layer 12 located between these and an equal distance from the processor-data information tracks are servo position information tracks $ST_1$, $ST_2$, $ST_3$ and $ST_4$, which are recorded in the higher coercivity layer 11 of disk 10. Thus $ST_1$ and $ST_2$ are located an equal distance from and on opposite sides of the processor-data information track $DT_1$ whereas servo position information track $ST_2$ and servo position information track $ST_3$ are located an equal distance from the processor-data information track $DT_2$ and likewise servo position information tracks $ST_3$ and $ST_4$ are located equal distance from processor-data information track $DT_3$.

Figure 4:
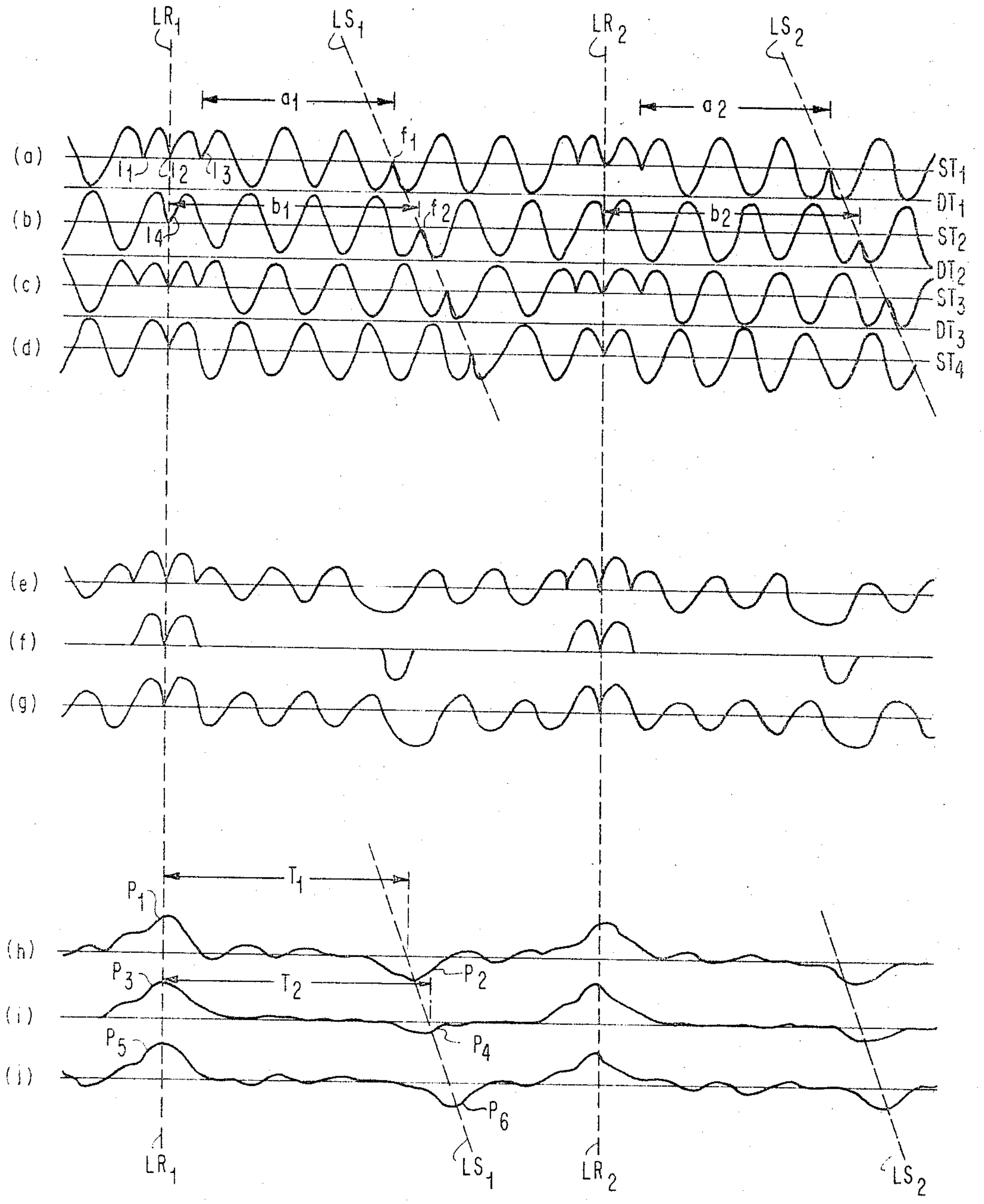
FIGURE 4 illustrates waveforms useful in explaining the embodiment of the invention illustrated in FIGURES 1 and 2.

FIGURE 4(*a*) through (*d*) illustrates the waveforms that will be generated by the servo position information tracks in a magnetic pickup aligned with servo position information tracks $ST_1$ through $ST_4$, respectively. The waveform in FIGURE 4(*a*) includes a plurality of time periods $a_1$, $a_2$, etc., during which the servo track will generate a sinusoidal signal. As shown in FIGURE 4(*a*), these periods are defined by leading edge phase reversals termed radial lines and trailing edge phase reversals termed spiral lines of the sine wave. More specifically, prior to the time period $a_1$, there are three phase reversals of the sine wave and are illustrated as $l_1$, $l_2$ and $l_3$. At the end or trailing or at the trailing edge of the time period $a_1$, there is a single phase reversal $t_1$ which is a phase reversal of the opposite sense or polarity as the phase reversals $l_1$, $l_2$, $l_3$. Thus, it will be seen that a coarse position time period can be defined by the time period from the radial line $LR_1$ passing through $l_2$ to the trailing spiral line $LS_1$ passing through $t_1$. Similar phase reversals and sine wave portions are repeated throughout the servo track $ST_1$.

Servo position information track $ST_2$ is located on the opposite side of the processor-data information track $DT_1$ as shown in FIGURES 3 and 4, and the same distance as track $ST_2$ from track $DT_1$. This servo position information track has likewise repeated pure sine wave sections $b_1$, $b_2$, etc. as shown in FIGURE 4(*b*); however, these sine wave sections are 180 degrees out of phase with the sine wave signal generated during periods $a_1$, $a_2$, etc. by servo position information track $ST_1$. The leading edge of the sine wave section $b_1$ is defined by a single phase reversal $l_4$ at the leading edge of the time period defined by this portion and is also part of the radial line $LR_1$. The trailing edge of the sine wave portion $b_1$ is defined by a phase reversal of the opposite sense and illustrated by $t_2$ in FIGURE 4(*b*) and is also part of the spiral line $LS_1$. As shown in FIGURE 4, the servo position information track $ST_2$ has a plurality of these sine wave periods $b_1$, $b_2$ with the phase reversals defining similar time periods. The locus of the leading edges of these coarse position time periods defined by phase reversals $l_2$, $l_4$ and corresponding phase reversals in servo position information tracks $ST_3$ and $ST_4$, is shown by radial line $LR_1$ and as shown in FIGURE 3, is physically located on the disk 10 in radial alignment such as shown in copending patent application Ser. No. 420,009, filed Dec. 21, 1964, in the name of Black et al. The trailing edge of the coarse position time periods shown by negative phase reversals $t_1$, $t_2$ and corresponding phase reversals in servo position information tracks $ST_3$ and $ST_4$ define a spiral line, is shown in a time domain as $LS_1$ in FIGURE 4 and physically in FIGURE 3 in a spiral configuration similar to the spiral lines and time periods shown in the above entitled patent application.

As set forth in the above identified patent application, by utilizing the coarse position time periods, with the trailing edges spirally disposed spacially on the disk, these time periods can be made to vary linearly as the radial distance of the track from the periphery of the disk as shown in FIGURE 4. Thus, by utilizing this configuration of position time periods on each servo position information track, coarse adjustment of the pickup head near to a processor-data information track can be made.

The pickup circuitry 20 includes a magnetic pickup head 21 which is positioned over the disk 10 to simultaneously receive the servo position information as well as the processor-data information from the servo position information and processor-data information tracks. If the pickup 21 is on one side of a processor-data information track, the resulting output signal from head 21 due to the servo tracks will, for example, appear as the waveform illustrated in FIGURE 4(*e*). If the pickup head is on the other side of the processor-data information track, the signal will appear as in FIGURE 4(*g*). If, however, the pickup head is aligned with the processor data information track, the output will appear as illustrated by FIGURE 4(*f*). The output of the pickup 21 is preferably applied to an A.C. amplifier 22, the output of which is applied to a servo position information signal bandpass amplifier 23 which has a bandpass characteristic to pass the servo position information signal frequencies but to eliminate the processor-data information track frequencies (not shown in FIGURE 4). The output from the bandpass 23 is applied to the coarse position detector 40 through a pulse shaping network 30. The pulse shaping network 30 includes a low pass filter 31 that will substantially smooth out the sine wave frequencies occurring, for example, in time periods $a_1$ and $b_1$ shown in FIGURES 4(*e*) and (*g*), and enhance the lower frequency harmonics due to the phase reversals of the coarse information. Thus, the output of filter 31 for the waveform shown in FIGURES 4(*e*), (*f*), and (*g*) will appear as the waveform shown in FIGURES 4(*h*), (*i*) and (*j*), respectively. It will be noted that the leading edge pulses $P_1$, $P_3$ and $P_5$ are, for example, positive going and of a first polarity whereas the trailing edge pulses such as $P_2$, $P_4$ and $P_6$ are of the opposite sense and negative going. The wave shaping network 30 as well as the coarse position detector 40 per se form no part of this invention and, in fact, are the same as the coarse position detector illustrated in the above identified copending application Ser. No. 420,009.

Figure 2:
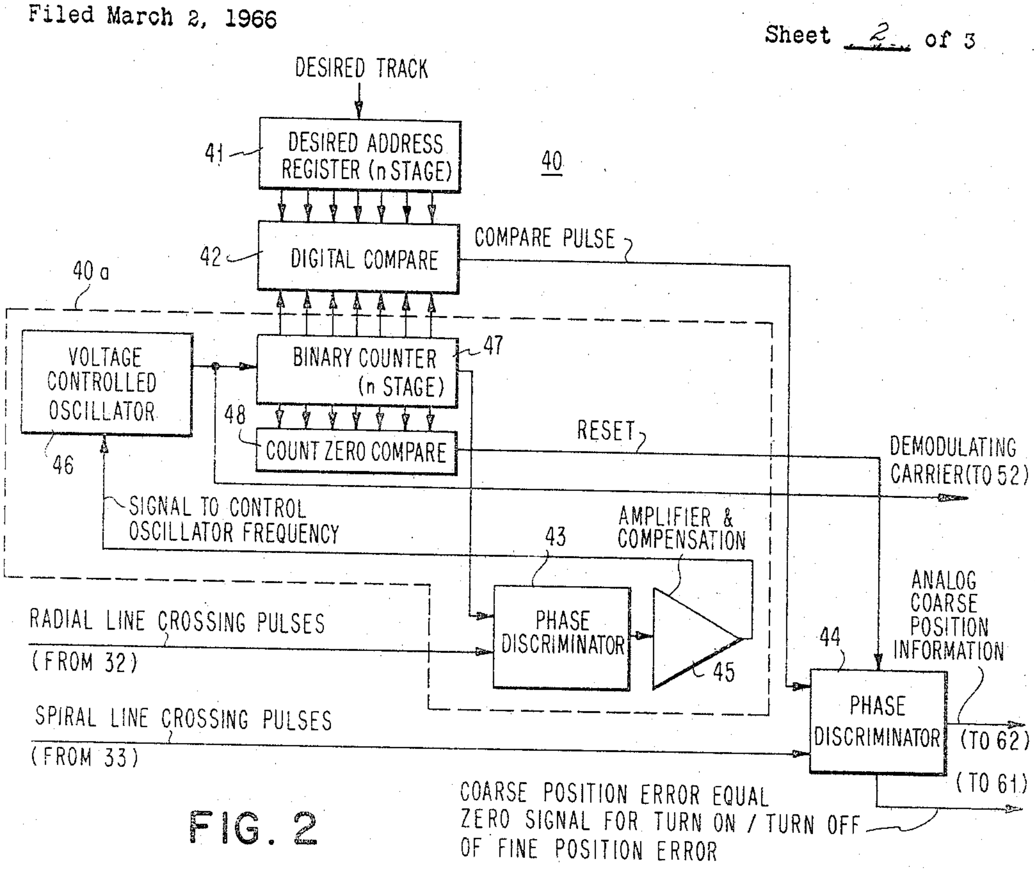
FIGURE 2 is a more detailed schematic diagram in block form of the coarse position detector illustrated in FIGURE 1.

The waveforms out of the low pass filter 31 are applied to a radial line detector 32 as well as a spiral line detector 33. Thus, the positive going leading edge pulses $P_1$, $P_3$ and $P_5$ will appear at the output of the radial line detector 32 (such as a clipper) whereas the trailing edge pulses $P_2$, $P_4$ and $P_6$ will appear at the output of the spiral line detector 33 (such as a limiter). Both of these outputs are applied to the coarse position detector 40 shown in detail in FIGURE 2, which is similar to the coarse position detector illustrated in the above pending application. More specifically, the radial line detector 32 applies the positive going time-base pulses to a conventional digital phase discriminator 43 and the spiral line or position pulses (negative going) are applied to a phase discriminator 44. The discriminator 43 also receives a pulse from counter 47 when it has completed a counting cycle. The discriminator 43 has a continually varying signal having an amplitude and polarity which indicates the phase difference, if any, between counter 47 and the passing of pickup 21 over the radial lines. Such a discriminator is commonly utilized as horizontal AFC circuit in television sets, however, may take the form shown in U.S. Patent No. 3,005,165 issued Oct. 17, 1961, entitled, "Pulse Position Error Detector." Discriminator 44 is illustrated in detail in FIGURE 3 of the above identified copending application Ser. No. 420,009. The output of the phase discriminator 43 is applied to an amplifier and servo compensator 45 which is applied to a voltage controlled oscillator 46 whose frequency is controlled by the frequency of occurrence of the radial line or positive going leading edge pulses ($P_1$, $P_3$, etc.). As set forth in the above pending application, and as illustrated here, the elements included within the dotted line function illustrated as 40*a* constitute a phase lock reference count generator. The output of the voltage controlled oscillator 46 is applied to a binary counter 47 whose output is also connected to phase discriminator 43 so as to force the voltage controlled oscillator 46 to run at a frequency such that the time required for the binary counter 47 to count through the total number of data tracks is exactly the same as the time between $LR_1$ and $LR_2$. The counter 47 is reset to zero after this counting through this time period. Hence, the time between radial lines ($LR_1$, $LR_2$, etc.) is divided into sub-portions of time, each corresponding to a unique data-track radial position. The variation in time due to disk 10 rotational variation is thusly eliminated.

The digital quantity output of the binary counter 47 is applied to a digital compare circuit 42 having an input from a desired address register 41. More specifically, the register 41 receives the information as to the desired track from the interrogational processor. The digital compare circuit will give a compare pulse when the desired address register 41 and the binary counter 47 have the same numerical quantity stored in each. A count zero pulse from 48 applies a reset pulse to discriminator 44 when binary counter 47 is at zero. This resets the discriminator 44 to zero at the beginning of each time period beginning when the pickup 21 passes over a radial line $LR_1$, $LR_2$, etc. That is, this compare pulse is applied to the phase discriminator 44 and the time of occurrence as measured from binary count zero (reset) corresponds to a length of time to be compared to the length of time between the radial line pulse and the spiral line pulse. If the time period between the leading and trailing pulses generated from the tracks over which the head is positioned, is that of the desired track, there will be no information emanating from the phase discriminator 44 and into the resolving unit 60. Hence, the length of time between the count zero (reset) pulse from 48 and the compare pulse at the output of 47 is the addressing reference signal of this positioning servo, and the length of time between the radial line pulse and the spiral line pulse is the actual position or servo output indicator. It can therefore be seen that the phase lock reference count generator guarantees that count zero (reset) and the radial line pulse occur simultaneously. The output of the phase discriminator 44 is an analog voltage, the magnitude of which is a function of the time between the pulses from 42 and 33. As stated above, discriminator 44 is then reset to zero by a count zero pulse from 48. The polarity of the output of 44 will be dependent on which pulse (from 42 or 33) occurs first. This will indicate on which side of the desired track the pickup 21 is positioned.

The output of the phase discriminator 44 is also applied to gate 61 of the resolving network 60. So long as there is a significant output from the phase discriminator 44, the gate 61 will be closed and there will be no fine position signal applied into the analog summing junction 62 so that only coarse position error will pass through summing junction 62. When, however, there is minimal coarse position error from the phase discriminator 44, the linear gate 61 will be opened and fine position error information will be permitted to pass through the linear gate 61, adder 62 to an analog summing junction 63. While, however, the coarse position error information is present at the summing junction 62, it will be applied through analog summing junction 63 to a linear actuator 64. The actuator 64 will drive a probe 65 on which the pickup head 21 is mounted so as to effect a coarse positioning action to pickup head 21, driving it near the desired data track.

Thus, it is seen that the pulses such as illustrated in FIGURE 4(*h*) through (*j*) are passed through a low pass filter 31 so that the coarse positioning will be obtained or can be obtained identically to the above patent application. Circuitry detecting the peak of the pulses is used to better resolve their times of occurrence.

The output of the servo signal bandpass amplifier 23 (for example, the waveforms illustrated in FIGURE 4(*e*), (*f*) and (*g*)) will also be applied to the fine positioning channel 50 which includes a filter 51 and a synchronous demodulator 52. A suitable such demodulator is illustrated in section 4–2 of "Information, Transmission, Modulation, and Noise" by M. Schwartz; McGraw-Hill Inc., 1959. The filter 51 is tuned to pass the carrier frequency so that the demodulator output is not affected by the timing pulses (the phase reversals).

The demodulator 52 is connected to gate 61 so that the output of the synchronous demodulator will provide a fine position error signal (analog) having an amplitude which varies as a function of the displacement of the head relative to the desired processor-data information track in having a sense or polarity corresponding to the direction with which the pickup 21 is displaced from the processor-data information track. Thus, when the coarse position error signal from coarse position detector 40 is near zero, the gate 61 will be open and the fine position error signal from the synchronous demodulator 52 will be applied to the summing junction 62 and thence to a summing junction 63. The purpose of the summing junction 63 is to introduce a damping signal in the form of velocity error information from a tachometer 70 so as to prevent instability of the actuator 64 when providing positioning of the head 21 in response to the servo loop signals. As is conventional in a closed loop servo, a tachometer 70 can be employed to measure the velocity of the actuator 64 and thereby provide for damping and stabilization. This damping is provided during both fine and coarse positioning.

It will be noted that at the radial line there are three phase reversals on the servo position information track $ST_1$ as well as on track $ST_3$ whereas the servo position information tracks $ST_2$ and $ST_4$, there is only one phase reversal on the radial line. Thus, the phase of the sinusoidal, constant-frequency portion of the servo position information tracks will remain in correct phase opposition with adjacent tracks once the region of coarse information is passed. Hence, the difference in phase reversals on the leading edge of the time periods is two phase reversals or 360 degrees, the sine wave portions of the $a_1$ and $b_1$ will remain in phase opposition or 180 degrees out of phase.

By way of example, let it be assumed that the instructions to the desired address register 41 are that information is desired from processor-data information track $DT_1$. The address register 41 will have a count corresponding to a time period midway between the coarse time periods of the two servo tracks adjacent the desired data information track. If $DT_1$ is the desired data information track, the count in register 41 would correspond to $$\frac{T_1+T_2}{2}$$

On the dual coercivity disk, however, a servo track could be recorded directly above or bleow a processor data information track. If this is done the address register will contain a count corresponding to the time period ($T_1$, $T_2$, etc.) of the servo track above or below the desired data information track. The pickup 21 will apply a signal through servo bandpass 23, low pass filter 31 into the radial and spiral line detectors 32 and 33, respectively, and thence, into the coarse position detector 40. There will be an output corresponding to the coarse position error from the phase discriminator 44 so as to move the pickup head inwardly or outwardly of the disk 10 by applying this signal through summing junction 62, summing junction 63 and the actuator 64. When the signal waveform shown in FIGURE 4(*b*) is received, it is detected that the radial line pulse $P_3$ and the spiral line pulse $P_4$ are the desired time position period apart; that is, time period $T_2$ as shown in FIGURE 4(*i*). This is determined by the averaging of the radial and spiral line pulses of servo tracks $ST_1$ and $ST_2$ as shown in FIGURE 4(*f*). When this is reached, the coarse position error signal goes to zero and by adjustment of the servo, the pickup head has been positioned near the processor-data information track $DT_1$, between $ST_1$ and $ST_2$. When the analog coarse position error signal is essentially zero, this results in the linear gate 61 being opened to thereby permit a fine positioning error signal to pass. As the magnetic memory disk is rotated relative to the pickup head 21, the pickup head will be receiving both servo position information signals $ST_1$ and $ST_2$ which are in phase opposition during the sine wave periods $a_1$ and $b_1$. The time periods $a_1$ and $b_1$ depend upon the total number of track positions to be addressed and is relatively long compared to the phase reversal periods so that the phase reversal such as $1_1$, $1_2$, $1_3$, $1_4$, etc. will not significantly effect the output of the synchronous demodulator 50 or, that is, the fine position error. If, during the fine positioning mode, the pickup head 21 is located closer to the track $ST_1$ than the servo track $ST_2$, a waveform such as that shown in FIGURE 4(*e*) will appear at the input of the synchronous demodulator 50. When this signal is demodulated by the carrier received from the output of oscillator 46, there will be an analog output having an amplitude proportional to the displacement of the head from the processor-data information track $DT_1$ and of a polarity which will indicate the direction of displacement of the pickup with respect to this processor-data track. If, however, the pickup head 21 is closer to the servo position information track $ST_2$, that is, between $DT_1$ and servo position information track $ST_2$, a waveform such as that shown in FIGURE 4(*g*) will appear at the input of the synchronous demodulator 50 and will provide, when demodulated by the output of 46, an analog output signal having an opposite polarity so as to indicate the direction of the displacement of the pickup head 21 with respect to the processor-data information track $DT_1$, and having an amplitude which varies as a function of the distance of displacement from this processor-data information track. This fine positioning error will pass through the linear gate 61 through summing junction 62 and into the summing junction 63. In the summing junction 63, the velocity or damping signal is introduced from a tachometer 70 in a conventional manner so as to maintain stability during the positioning by the actuator 64 of the head 21.

When the fine adjustment results in the air gap of the pickup 21 being positioned directly over the processor-data information track $DT_1$, a waveform such as that shown in FIGURE 4(*f*) will appear since the sine wave sections $a_1$ and $b_1$ will completely cancel out and the waveform portions adjacent to the phase reversal $l_4$ will add with the phase reversal sections between $1_1$, $1_2$ and $1_3$ as will the waveform portions adjacent to the trailing phase reversals $t_1$ and $t_2$. Consequently, when the air gap of pickup 21 is in final fine alignment, the waveform shown in FIGURE 4(*f*) will indicate so and the data track information can then be acquired with a maximum signal to noise ratio and a minimum of interference.

Consequently, it will be seen that by utilizing the waveforms of the servo position information track shown in FIGURE 4(*a*) through (*d*) in conjunction with a dual magnetic layer disk 10, these waveforms contain both fine and coarse position information which can be sensed through the single pickup head and more specifically can be sensed by the pickup head which also reads out the processor-data information. By utilizing the servo position information tracks of the same frequency in a phase opposition, the output of the single head will operate to compare the several waveforms rather than requiring two separate heads and/or other waveform indicia thereon or characteristics thereof to then subsequently compare the waveforms. In addition, since the sine wave or fine positioning information is of the same frequency, separate filters and filter matching are not required and harmonic content during this period is at a minimum as well as bandwidth required for servo information. The phase reverses as illustrated in FIGURE 4; that is $1_1$, $1_2$, $1_3$, and $1_4$ have a relatively low harmonic content compared to a pulse type system. It is well known that an isolated sharp pulse has a flat frequency spectrum containing every possible frequency component. An isolated portion of a sine wave contains significant harmonics only to ± three times the basic frequency of the sine wave.

While the invention has been particularly shown and described with reference embodiment thereof, it should be understood by those skilled in the art that the foregoing and other changes in form and details may be made therein without departing from the spirit and scope of the invention.

What is claimed is:

1. A system for determining the relative position of a first and a second member, first means coupled to said first member for effecting a first signal in response to relative movement between said first and said second members having a portion that is continuous and periodically varies as a function of the distance between said first means and said first member, said first signal having a first and a second timing signal defining a first position time period, second means spaced from said first means and coupled to said first member for effecting a second signal in response to relative movement of said first and said second members having a portion that is continuous and periodically varies as a function of the distance between said second means and said first member, said second signal having a third and fourth timing signal defining a second position time period enabling coarse detection of the relative position of said first and second members, means comparing said first and said second signal and providing an output signal in response to a predetermined relationship between said first and said second signals to enable fine detection of the relative position of said first and said second members.

2. A system for determining the relative position of a first and a second member, first means mounted on said second member and coupled to said first member effecting a first continuous periodically varying signal in response to relative movements of said first and second members that varies as a function of the distance between said first means and said first member, second means coupled to said first member and spaced from said first means on said second member effecting a second continuous periodically varying signal in response to relative movement of said first and second members that varies as a function of the distance between said second means and said first member with said second signal having the same frequency as and in phase opposition with said first signal, means translating said first and said second signal to provide an output signal which continuously varies as a function of the relative position of said first and said second member, said first signal includes first and second timing signals that define a first position time period, and said second signal includes third and fourth timing signals that define a second position time period so as to enable coarse detection of the relative position of said first and said second members.

3. A system as set forth in claim 2 including detector means responsive to said first, second, third and fourth timing signals to effect a coarse positioning of said first member relative to said second member, and after said coarse positioning to provide a fine positioning of said first member relative to said second member in response to said output signal.

4. A servosystem for positioning a pickup member in a predetermined position with respect to a plurality of discrete data tracks, a first servo track mounted on one side of one data track and responsive to relative movement between said pickup and said servo track to effect a first signal having portions that are sine waves which vary as the function of the distance between said pickup and said first servo track, a second servo track positioned on the opposite side of said one data track and responsive to relative movement between said pickup and said second servo track to effect a second servo signal having a sine wave which varies as a function of the distance between said pickup and said second servo track with said second sine wave portion having the same frequency as and in phase opposition to said first sine wave portion so as to effect cancellation of said second sine wave portions when said pickup is equidistant between said first and said second sine wave portions and provide an output signal which continuously varies as a function of the relative position of said pickup with respect to said one data track, first and second timing signals on opposite sides of said first sine wave portion to define a first position time period, third and fourth timing signals on opposite sides of said second sine wave portion that define a second time position period so as to enable course detection of the relative position of said pickup with respect to said first and said second servo track, said first timing signal being N number of phase reversals of said first sine wave portion where N equals any whole integer, and said third timing signal being $k \times N$ number of phase reversals of said second sine wave portion where $k$ equals any integer other than 1.

5. A servosystem as set forth in claim 4 including detector means responsive to said first, second, third and timing signals to effect a coarse positioning of said pickup member with respect to said one data track and after said coarse positioning to provide a fine positioning of said pickup member with respect to said one data track in response to said output signal.

6. A servosystem as set forth in claim 4 wherein said first and said third timing signals are phase reversals of the respective sine wave portions in the first sense and said second and said fourth timing signals are a phase reversal of the respective sine wave portions in an opposite sense.

7. A servosystem as set forth in claim 6 wherein said first and said second servo track, and said one data track are magnetic memory tracks, and said pickup means is a magnetic pickup.

References Cited

UNITED STATES PATENTS

| | | | |
|---|---|---|---|
| 3,263,031 | 7/1966 | Welsh | 340—174.1 |
| 3,185,972 | 5/1965 | Sippel | 340—174.1 |
| 2,709,204 | 5/1955 | Holmes | 340—174.1 |

TERRELL W. FEARS, *Primary Examiner.*

V. P. CANNEY, *Assistant Examiner.*